US009424087B2

(12) United States Patent
Archer et al.

(10) Patent No.: US 9,424,087 B2
(45) Date of Patent: Aug. 23, 2016

(54) OPTIMIZING COLLECTIVE OPERATIONS

(75) Inventors: Charles J. Archer, Rochester, MN (US); James E. Carey, Rochester, MN (US); Matthew W. Markland, Rochester, MN (US); Philip J. Sanders, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1517 days.

(21) Appl. No.: 12/770,286

(22) Filed: Apr. 29, 2010

(65) Prior Publication Data
US 2011/0270986 A1 Nov. 3, 2011

(51) Int. Cl.
G06F 15/173 (2006.01)
G06F 9/50 (2006.01)
H04L 29/08 (2006.01)

(52) U.S. Cl.
CPC ............... *G06F 9/5011* (2013.01); *H04L 67/10* (2013.01)

(58) Field of Classification Search
CPC ....................................................... H04L 67/10
USPC .................................. 709/226, 227; 707/107
See application file for complete search history.

(56) References Cited

U.S. PATENT DOCUMENTS

| 4,715,032 A | 12/1987 | Nilsson |
| 4,843,540 A | 6/1989 | Stolfo |
| 5,101,480 A | 3/1992 | Shin et al. |
| 5,105,424 A | 4/1992 | Flaig et al. |
| 5,333,279 A | 7/1994 | Dunning |
| 5,377,333 A | 12/1994 | Nakagoshi et al. |
| 5,513,371 A | 4/1996 | Cypher et al. |
| 5,541,914 A | 7/1996 | Krishnamoorthy et al. |
| 5,590,334 A | 12/1996 | Saulpaugh et al. |
| 5,617,538 A | 4/1997 | Heller |
| 5,668,815 A | 9/1997 | Gittinger et al. |
| 5,721,828 A | 2/1998 | Frisch |
| 5,822,604 A | 10/1998 | Ogasawara et al. |
| 5,822,605 A | 10/1998 | Higuchi et al. |
| 5,826,049 A | 10/1998 | Ogata et al. |
| 5,832,215 A | 11/1998 | Kato et al. |

(Continued)

FOREIGN PATENT DOCUMENTS

| EP | 1835414 A2 | 9/2007 |
| JP | 2000156039 A | 6/2000 |

(Continued)

OTHER PUBLICATIONS

Office Action, U.S. Appl. No. 11/754,740, Apr. 11, 2011.

(Continued)

*Primary Examiner* — Adnan Mirza
(74) *Attorney, Agent, or Firm* — Brandon C. Kennedy; Grant A. Johnson; Kennedy Lenart Spraggins LLP

(57) ABSTRACT

Optimizing collective operations including receiving an instruction to perform a collective operation type; selecting an optimized collective operation for the collective operation type; performing the selected optimized collective operation; determining whether a resource needed by the one or more nodes to perform the collective operation is not available; if a resource needed by the one or more nodes to perform the collective operation is not available: notifying the other nodes that the resource is not available; selecting a next optimized collective operation; and performing the next optimized collective operation.

20 Claims, 10 Drawing Sheets

(56) References Cited

U.S. PATENT DOCUMENTS

| | | | |
|---|---|---|---|
| 5,864,712 A | 1/1999 | Carmichael et al. | |
| 5,875,329 A | 2/1999 | Shan | |
| 5,878,241 A | 3/1999 | Wilkinson et al. | |
| 5,892,923 A | 4/1999 | Yasuda et al. | |
| 5,937,202 A | 8/1999 | Crosetto et al. | |
| 5,949,988 A | 9/1999 | Feisullin et al. | |
| 5,958,017 A | 9/1999 | Scott et al. | |
| 6,000,024 A | 12/1999 | Maddox et al. | |
| 6,038,651 A | 3/2000 | VanHuben et al. | |
| 6,067,609 A | 5/2000 | Meeker et al. | |
| 6,076,131 A | 6/2000 | Nugent | |
| 6,108,692 A | 8/2000 | Van Seters et al. | |
| 6,212,617 B1 | 4/2001 | Hardwick | |
| 6,272,548 B1 | 8/2001 | Cotter et al. | |
| 6,289,424 B1 | 9/2001 | Stevens | |
| 6,292,822 B1 | 9/2001 | Hardwick | |
| 6,334,138 B1 | 12/2001 | Kureya | |
| 6,473,849 B1 | 10/2002 | Keller et al. | |
| 6,480,885 B1 | 11/2002 | Olivier | |
| 6,647,438 B1 | 11/2003 | Conner et al. | |
| 6,691,101 B2 * | 2/2004 | MacNicol et al. | 707/714 |
| 6,714,552 B1 | 3/2004 | Cotter | |
| 6,742,063 B1 | 5/2004 | Hellum et al. | |
| 6,754,211 B1 | 6/2004 | Brown | |
| 6,834,301 B1 | 12/2004 | Hanchett | |
| 6,914,606 B2 | 7/2005 | Amemiya et al. | |
| 6,954,806 B2 | 10/2005 | Yosimoto et al. | |
| 7,133,359 B2 | 11/2006 | Weis | |
| 7,143,392 B2 | 11/2006 | Ii et al. | |
| 7,171,484 B1 | 1/2007 | Krause et al. | |
| 7,203,743 B2 | 4/2007 | Shah-Heydari | |
| 7,263,598 B2 | 8/2007 | Ambuel | |
| 7,263,698 B2 | 8/2007 | Wildhagen et al. | |
| 7,284,033 B2 | 10/2007 | Jhani | |
| 7,363,474 B2 | 4/2008 | Rodgers et al. | |
| 7,496,699 B2 | 2/2009 | Pope et al. | |
| 7,539,989 B2 | 5/2009 | Blackmore et al. | |
| 7,555,566 B2 | 6/2009 | Blumrich et al. | |
| 7,571,439 B1 | 8/2009 | Rabinovici et al. | |
| 7,587,516 B2 | 9/2009 | Bhanot et al. | |
| 7,590,983 B2 * | 9/2009 | Neiman et al. | 718/100 |
| 7,600,095 B2 | 10/2009 | Archer et al. | |
| 7,640,315 B1 | 12/2009 | Meyer et al. | |
| 7,664,110 B1 | 2/2010 | Lovett et al. | |
| 7,707,366 B2 | 4/2010 | Tagawa | |
| 7,739,451 B1 | 6/2010 | Wiedenman et al. | |
| 7,774,448 B2 | 8/2010 | Shah-Heydari | |
| 7,796,527 B2 | 9/2010 | Archer et al. | |
| 7,808,930 B2 | 10/2010 | Boers et al. | |
| 7,853,639 B2 | 12/2010 | Archer et al. | |
| 7,936,681 B2 | 5/2011 | Gong et al. | |
| 7,974,221 B2 | 7/2011 | Tamassia et al. | |
| 8,161,268 B2 | 4/2012 | Faraj | |
| 8,161,480 B2 | 4/2012 | Archer et al. | |
| 2002/0016901 A1 | 2/2002 | Carvey et al. | |
| 2002/0054051 A1 | 5/2002 | Ladd | |
| 2002/0065984 A1 | 5/2002 | Thompson et al. | |
| 2002/0144027 A1 | 10/2002 | Schmisseur | |
| 2003/0041173 A1 | 2/2003 | Hoyle | |
| 2003/0182376 A1 | 9/2003 | Smith | |
| 2003/0188054 A1 | 10/2003 | Yosimoto et al. | |
| 2003/0212877 A1 | 11/2003 | Dally et al. | |
| 2004/0034678 A1 | 2/2004 | Kuszmaul et al. | |
| 2004/0073590 A1 | 4/2004 | Bhanot et al. | |
| 2005/0094577 A1 | 5/2005 | Ashwood-Smith | |
| 2005/0135395 A1 | 6/2005 | Fan et al. | |
| 2005/0165980 A1 | 7/2005 | Clayton et al. | |
| 2005/0243711 A1 | 11/2005 | Alicherry et al. | |
| 2006/0156312 A1 | 7/2006 | Supalov | |
| 2006/0168359 A1 | 7/2006 | Bissessur et al. | |
| 2006/0179181 A1 | 8/2006 | Seong | |
| 2006/0182137 A1 | 8/2006 | Zhou et al. | |
| 2006/0277323 A1 | 12/2006 | Joublin et al. | |
| 2007/0110063 A1 | 5/2007 | Tang et al. | |
| 2007/0174558 A1 | 7/2007 | Jia et al. | |
| 2007/0226686 A1 | 9/2007 | Beardslee et al. | |
| 2007/0242611 A1 | 10/2007 | Archer et al. | |
| 2007/0245122 A1 | 10/2007 | Archer et al. | |
| 2007/0288935 A1 | 12/2007 | Tannenbaum et al. | |
| 2008/0077366 A1 | 3/2008 | Neuse et al. | |
| 2008/0109569 A1 | 5/2008 | Leonard et al. | |
| 2008/0127146 A1 | 5/2008 | Liao et al. | |
| 2008/0201603 A1 | 8/2008 | Ritz et al. | |
| 2008/0250325 A1 | 10/2008 | Feigenbaum et al. | |
| 2008/0273543 A1 | 11/2008 | Blocksome et al. | |
| 2008/0288949 A1 | 11/2008 | Bohra et al. | |
| 2008/0301683 A1 | 12/2008 | Archer et al. | |
| 2009/0006662 A1 | 1/2009 | Chen et al. | |
| 2009/0019218 A1 | 1/2009 | Sinclair et al. | |
| 2009/0019258 A1 | 1/2009 | Shi | |
| 2009/0037377 A1 | 2/2009 | Archer et al. | |
| 2009/0037707 A1 | 2/2009 | Blocksome | |
| 2009/0043910 A1 | 2/2009 | Barsness et al. | |
| 2009/0064140 A1 | 3/2009 | Arimilli et al. | |
| 2009/0064176 A1 | 3/2009 | Ohly et al. | |
| 2009/0067334 A1 | 3/2009 | Archer et al. | |
| 2009/0154486 A1 | 6/2009 | Archer et al. | |
| 2009/0196361 A1 | 8/2009 | Chan et al. | |
| 2009/0248712 A1 | 10/2009 | Yuan | |
| 2009/0259713 A1 | 10/2009 | Blumrich et al. | |
| 2009/0292905 A1 | 11/2009 | Faraj | |
| 2009/0310544 A1 | 12/2009 | Jain et al. | |
| 2009/0319621 A1 | 12/2009 | Barsness et al. | |
| 2010/0023631 A1 | 1/2010 | Archer et al. | |
| 2010/0082788 A1 | 4/2010 | Mundy | |
| 2010/0122268 A1 | 5/2010 | Jia | |
| 2010/0185718 A1 | 7/2010 | Archer et al. | |
| 2010/0191911 A1 | 7/2010 | Heddes et al. | |
| 2011/0010471 A1 | 1/2011 | Heidelberger et al. | |
| 2011/0119673 A1 | 5/2011 | Bloch et al. | |
| 2011/0125974 A1 | 5/2011 | Anderson | |
| 2011/0153908 A1 | 6/2011 | Schaefer et al. | |
| 2011/0179134 A1 | 7/2011 | Mayo et al. | |
| 2011/0258627 A1 | 10/2011 | Faraj et al. | |
| 2011/0267197 A1 | 11/2011 | Archer et al. | |
| 2012/0197882 A1 | 8/2012 | Jensen | |

FOREIGN PATENT DOCUMENTS

| | | |
|---|---|---|
| JP | 2003317487 A | 11/2003 |
| WO | WO 2007/057281 A1 | 5/2007 |

OTHER PUBLICATIONS

Final Office Action, U.S. Appl. No. 12/124,756, Mar. 28, 2011.
http://betterexplained.com/articles/swap-two-variables-using-xor, Jan. 16, 2007, betterexplained.com.
Office Action, U.S. Appl. No. 11/754,782, Jun. 23, 2011.
Final Office Action, U.S. Appl. No. 12/053,842, May 23, 2011.
Office Action, U.S. Appl. No. 12/176,816, Jun. 10, 2011.
Edmonds, "AM++: A Generalized Active Message Framework," pp. 1-10, Sep. 2010.
Bangalore. "Extending the Message Passing Interface (MPI)", Proc. of the 1994 Conf. on Scalable Parallel Libraries, IEEE, pp. 106-118, 1995.
Bafna, "Coprocessor Design to Support MPI Primitives in Configurable Mutliprocessors;" *Integration, the VSLI Journal*, vol. 40 , Issue 3 , pp. 235-252, Apr. 2007.
Keller, Rainer; "MPI Development Tools and Applications for the Grid," Jun. 2003, pp. 1-12.
Tang, Hong; "Optimizing threaded MPI execution on SMP clusters," *International Conference on Supercomputer*, Jun. 2001, pp. 381-392.
Sunggu Lee; Shin, K.G., "Interleaved all-to-all reliable broadcast on meshes and hypercubes," Parallel and Distributed Systems, IEEE Transactions on, vol. 5, pp. 449-458, May 1994.
Wikipedia. "Depth-First Search" May 5, 2007. http://web.archive.org/web/20070505212029/http://en.wikipedia.org/wiki/Depth-first_Search.
Bruck J., et al. Efficient Algorithms for all-to-all communications in multiportmessage-passing systems, Parallel and Distributed Systems, IEEE Transactions on, vol. 8, Issue: 11, pp. 1143-1156, Nov. 1997.

(56) References Cited

OTHER PUBLICATIONS

U.S. Appl. No. 60/271,124, filed Feb. 24, 2001, pp. 12-13, 27 and 42-43.
Sistare, et al.; Optimization of MPI collectives on clusters of large-scale SMP's, Conference on High Performance Networking and Computing, Proceedings of the 1999 ACM/IEEE conference on Supercomputing; 1999.
Tanenbaum, Structured Computer Organization, Second Edition, Prentice-Hall, Inc., 1984.
Rosenberg; Dictionarty of Computers, Information Processing & Telecommunications, Second Edition, John Wiley & Sons, 1987.
Herbordt, M.C., Weems, C.C.; "Computing Parallel Prefix and Reduction Using Coterie Structures"; Frontiers of Massively Parallel Computation; 1992; Fourth Symposium; Oct. 19-21, 1992; pp. 141-149.
Fisher, et al.; "Computing the Hough Transform on a Scar Line Array Processor"; IEEE Transactions on Pattern Analysis and Machine Intelligence; vol. II, No. 3; Mar. 1989; pp. 262-265.
Office Action, U.S. Appl. No. 11/279,620, Mar. 4, 2008.
Office Action, U.S. Appl. No. 11/279,620, Sep. 3, 2008.
Office Action, U.S. Appl. No. 11/279,620, Dec. 29, 2008.
Office Action, U.S. Appl. No. 11/769,367, Apr. 3, 2009.
Office Action, U.S. Appl. No. 11/459,387, Dec. 13, 2007.
Office Action, U.S. Appl. No. 11/459,387, Jul. 11, 2008.
Office Action, U.S. Appl. No. 11/459,387, Mar. 18, 2009.
Office Action, U.S. Appl. No. 11/737,286, Feb. 9, 2009.
Office Action, U.S. Appl. No. 11/737,209, Jul. 20, 2009.
Office Action, U.S. Appl. No. 11/843,090, Sep. 4, 2009.
M. Matsuda, T. Koduh, Y. Kodama, R. Takano, Y. Ishikawa, "Efficient MPI Collective Operations for Clusters in Longand-Fast Networks," cluster, pp. 1-9, 2006 IEEE International Conference on Cluster Computing, Sep. 2006.
DADO: A Tree-Structured Machine Architecture for Production Systems, Stolfo et al. AAAI Proceedings, 1982, Columbia University.
Eunseuk Oh, An All-Reduce Operation in Star Networks Using All-to-All Broadcast Communication Patterns, 2005, 1-8.
Xin Yuan, Bandwidth Efficient All-reduce Operation on Tree Topologies, 2001, 1-8.
Final Office Action, U.S. Appl. No. 11/769,367, Sep. 28, 2010.
Final Office Action, U.S. Appl. No. 12/053,842, Oct. 18, 2010.
Advisory Action, U.S. Appl. No. 12/053,842, Jan. 11, 2011.
Office Action, U.S. Appl. No. 12/053,842, Mar. 1, 2011.
Office Action, U.S. Appl. No. 12/503,902, Oct. 6, 2010.
Office Action, U.S. Appl. No. 12/060,492, May 27, 2010.
Final Office Action, U.S. Appl. No. 12/060,492, Dec. 2, 2010.
Office Action, U.S. Appl. No. 12/124,763, Oct. 14, 2010.
Office Action, U.S. Appl. No. 12/124,756, Oct. 18, 2010.
Notice of Allowance, U.S. Appl. No. 11/754,782, Dec. 16, 2011.
Notice of Allowance, U.S. Appl. No. 11/754,740, Nov. 8, 2011.
Notice of Allowance, U.S. Appl. No. 12/053,842, Oct. 14, 2011.
Office Action, U.S. Appl. No. 12/060,492, Jul. 16, 2012.
Notice of Allowance, U.S. Appl. No. 12/124,756, Dec. 14, 2011.
Office Action, U.S. Appl. No. 12/124,745, Jun. 15, 2012.
Office Action, U.S. Appl. No. 12/770,286, Jul. 5, 2012.
Office Action, U.S. Appl. No. 12/760,020, Feb. 13, 2012.
Notice of Allowance, U.S. Appl. No. 12/760,020, Jul. 30, 2012.
Notice of Allowance, U.S. Appl. No. 12/124,745, Mar. 6, 2013.
Final Office Action, U.S. Appl. No. 12/770,286, Jan. 29, 2013.
Final Office Action, U.S. Appl. No. 12/748,594, Mar. 22, 2013.
Notice of Allowance, U.S. Appl. No. 12/790,037, Mar. 15, 2013.
Final Office Action, U.S. Appl. No. 13/459,832, Jan. 4, 2013.
Notice of Allowance, U.S. Appl. No. 13/585,993, Jan. 31, 2013.
Office Action, U.S. Appl. No. 13/672,740, Apr. 2, 2013.
U.S. Appl. No. 12/770,286, filed Apr. 2010, Archer et al.
U.S. Appl. No. 12/748,594, filed Mar. 2010, Archer et al.
Final Office Action Dated Oct. 30, 2009 in U.S. Appl. No. 11/769,367.
Office Action Dated Jan. 14, 2010 in U.S. Appl. No. 11/843,083.
Office Action Dated Apr. 28, 2010 in U.S. Appl. No. 11/769,367.
Faraj, A., et al. "Automatic Generation and Tuning of MPI Collective Communication Routines", ICS' 05, Jun. 20-22, Boston, MA, USA. pp. 393-402, ACM.
Shrimali, G., et al., "Building Packet Buffers Using Interleaved Memories", (Proc. Sixth Workshop High Performance Switching and Routing (HPSR '05), May 2005, pp. 1-5, IEEE.
Ong, H., et al., "Kernel-level Single System Image for Petascale Computing", SIGOPS Oper. Syst. Rev., Apr. 2006, pp. 50-54, vol. 40, No. 2, ACM, New York, NY, USA.
Foster, I., et al., "Message Passing and Threads," Sourcebook of Parallel Computing, (Month Unknown) 2003, pp. 301-317, Morgan Kaufmann Publishers Inc. URL: http://web.eecs.utk.edu/~dongarra/WEB-PAGES/SPRING-2006/chapter10.pdf.
Simonsson, P., "Implementation of a Distributed Shared Memory using MPI," Chalmers University of Technology and Goteborg University, 2004, Supervised together with Anders Gidenstam, Master's Thesis, Finished Jan. 11, 2005, pp. 1-98, Goteborg, Sweden.
Message Passing Interface Forum,"MPI: A Message-Passing Interface Standard Version 2.2", MPI Specification, Sep. 4, 2009, pp. 1-647, High Performance Computing Center Stuttgart (HLRS).
Vetter, J., et al., "Real-Time Performance Monitoring, Adaptive Control, and Interactive Steering of Computational Grids", International Journal of High Performance Computing Applications Winter 2000, pp. 357-366 (10 Pages), vol. 14, No. 4, Sage Publications, Inc. Thousand Oaks, CA, USA.
Wikipedia, "Cache (computing)—Wikipedia, the free encyclopedia", Cache (computing), Edited by EmausBot, Jul. 22, 2011, Accessed Aug. 10, 2013, 6 Pages.
Wikipedia, "Fuzzy logic—Wikipedia, the free encyclopedia", Fuzzy Logic, Edited by Jeff Silvers, Aug. 1, 2011, Accessed Aug. 10, 2013, 10 Pages.
Wikipedia, "Depth-first search—Wikipedia, the free encyclopedia", http://web.archive.org/web/20070505212029/http://en.wikipedia.org/wiki/Depth-first_search, Apr. 29, 2009, pp. 1-5.
Sistare, S., et al., "Optimization of MPI collectives on clusters of large-scale SMP's", Conference on High Performance Networking and Computing, Proceedings of the 1999 ACM/IEEE Conference on Supercomputing; Nov. 1999, pp. 1-14, ACM, New York, NY, USA.
Tanenbaum, A., "Structured Computer Organization", Jan. 1984, pp. 1-5, Second Edition, Prentice-Hall, Inc., Englewood Cliffs, NJ, USA, ISBN: 0-13-854489-1.
Shaw, D., et al., DADO: A Tree-Structured Machine Architecture for Production Systems, AAAI-82 Proceedings, Jan. 1982, AAAI (www.aaai.org), pp. 242-46, AAAI Press.
Better Explained, "Swap two variables using XOR I BetterExplained", http://betterexplained.com/articles/swap-two-variables-using-xor, Accessed Jun. 4, 2011, pp. 1-8.
Rosenberg, J., "Dictionary of Computers, Information Processing & Telecommunications", Sep. 1987, pp. 1-5, Second Edition, John Wiley & Sons, New York, NY, USA.

* cited by examiner

OPTIMIZING COLLECTIVE OPERATIONS

BACKGROUND OF THE INVENTION

1. Field of the Invention

The field of the invention is data processing, or, more specifically, methods, apparatus, and products for optimizing collective operations.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Distributed computing is an area of computer technology that has experienced advances. Distributed computing generally refers to computing with multiple semi-autonomous computer systems that communicate through a data communications network. The semi-autonomous computer systems interact with one another in order to achieve a common goal. A computer program or application that executes in a distributed computing system may be referred to as a distributed program. Distributed computing may also refers to the use of distributed computing systems to solve computational problems. In distributed computing, a problem may be divided into many tasks, each of which may be solved by one of the semi-autonomous computer systems.

Some distributed computing systems are optimized to perform parallel computing. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

SUMMARY OF THE INVENTION

Optimizing collective operations by an operational group on a parallel computer, wherein the operational group comprises a plurality of compute nodes including receiving, by each of the nodes in the operational group, an instruction to perform a collective operation type; selecting, by each of the nodes in the operational group from a list of optimized collective operations, an optimized collective operation for the collective operation type; performing, by each of the nodes in the operational group, the selected optimized collective operation; determining, by one or more of the nodes in the operational group, whether a resource needed by the one or more nodes to perform the collective operation is not available; if a resource needed by the one or more nodes to perform the collective operation is not available: notifying, by one or more of the nodes in the operational group, the other nodes that the resource is not available; selecting, by each of the nodes in the operational group from the list of optimized collective operations, a next optimized collective operation; and performing, by each of the nodes in the operational group, the next optimized collective operation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
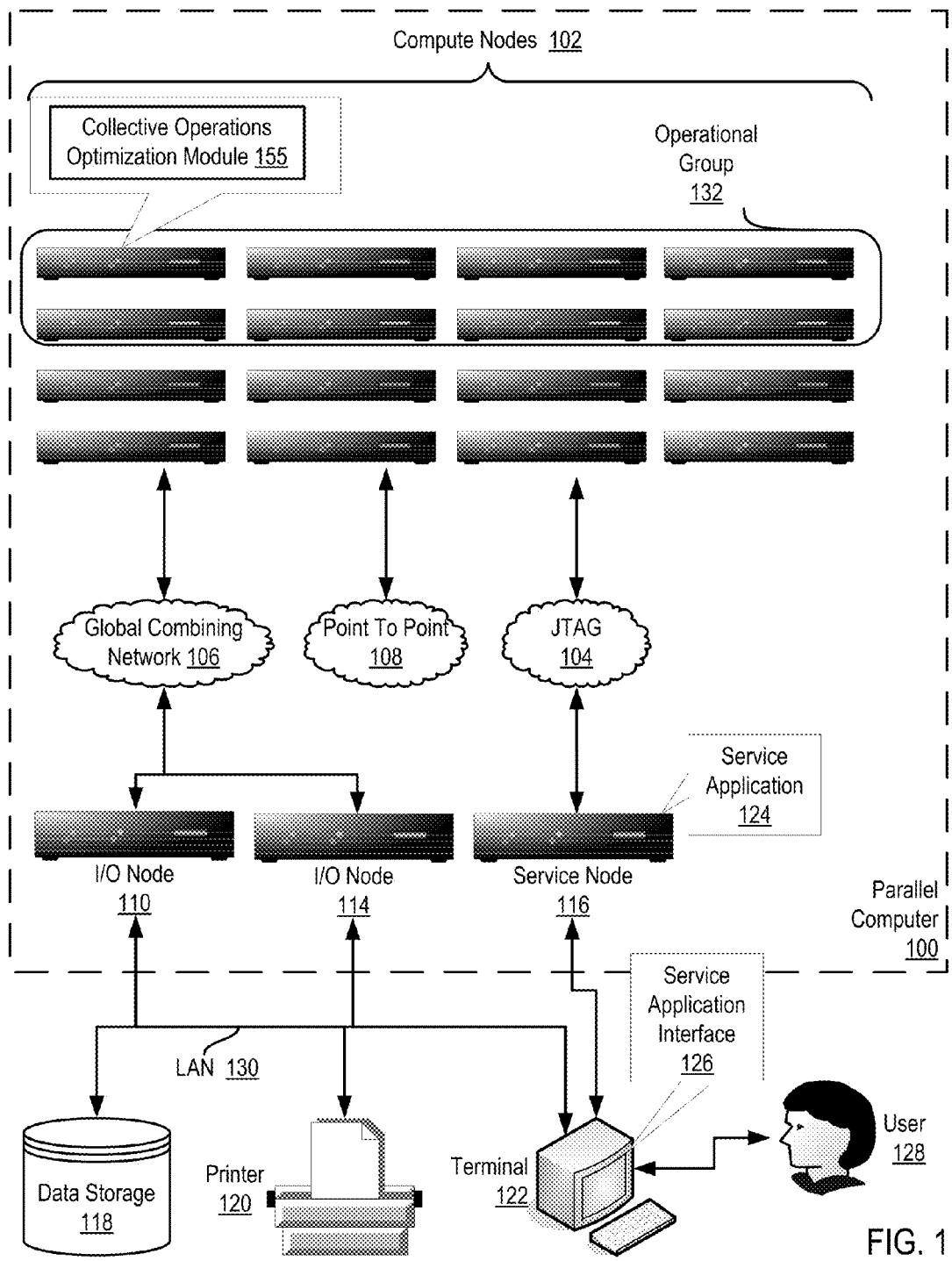
FIG. 1 illustrates an exemplary distributed computing system for optimizing collective operations by an operational group according to embodiments of the present invention.

Exemplary methods, apparatus, and products for optimizing collective operations by an operational group on a parallel computer in accordance with embodiments of the present invention are described with reference to the accompanying drawings, beginning with FIG. 1. FIG. 1 illustrates an exemplary distributed computing system for optimizing collective operations by an operational group on a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

Each compute node (102) of the operational group (132) of FIG. 1 has installed upon it a collective operations optimization module (155), a module of automated computing machinery for optimizing collective operations by an operational group on a parallel computer according to embodiments of the present invention. The collective operations optimization module is a module of automated computing machinery capable of receiving, by each of the nodes in the operational group, an instruction to perform a collective operation type; selecting, by each of the nodes in the operational group from a list of optimized collective operations, an optimized collective operation for the collective operation type; performing, by each of the nodes in the operational group, the selected optimized collective operation; determining, by one or more of the nodes in the operational group, whether a resource needed by the one or more nodes to perform the collective operation is not available; if a resource needed by the one or more nodes to perform the collective operation is not available: notifying, by one or more of the nodes in the operational group, the other nodes that the resource is not available; selecting, by each of the nodes in the operational group from the list of optimized collective operations, a next optimized collective operation; and performing, by each of the nodes in the operational group, the next optimized collective operation.

In the example of FIG. 1, only one of the compute nodes is illustrated as having a collective operations optimization module installed upon it. This is for ease of explanation and not for limitation. In fact, in the example of FIG. 1 a collective operations optimization module is installed on each of the compute nodes of the distributed processing system.

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The arrangement of nodes, networks, and I/O devices making up the exemplary system illustrated in FIG. 1 are for explanation only, not for limitation of the present invention. Data processing systems capable of [preamble] according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of optimizing collective operations by an operational group on a parallel computer according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Optimizing collective operations by an operational group on a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of optimizing collective operations by an operational group on a parallel computer according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is a collective operations optimization module (155), a module of automated computing machinery for optimizing collective operations by an operational group on a parallel computer according to embodiments of the present invention. The collective operations optimization module is a module of automated computing machinery capable of receiving, by each of the nodes in the operational group, an instruction to perform a collective operation type; selecting, by each of the nodes in the operational group from a list of optimized collective operations, an optimized collective operation for the collective operation type; performing, by each of the nodes in the operational group, the selected optimized collective operation; determining, by one or more of the nodes in the operational group, whether a resource needed by the one or more nodes to perform the collective operation is not available; if a resource needed by the one or more nodes to perform the collective operation is not available: notifying, by one or more of the nodes in the operational group, the other nodes that the resource is not available; selecting, by each of the nodes in the operational group from the list of optimized collective operations, a next optimized collective operation; and performing, by each of the nodes in the operational group, the next optimized collective operation.

Figure 2:
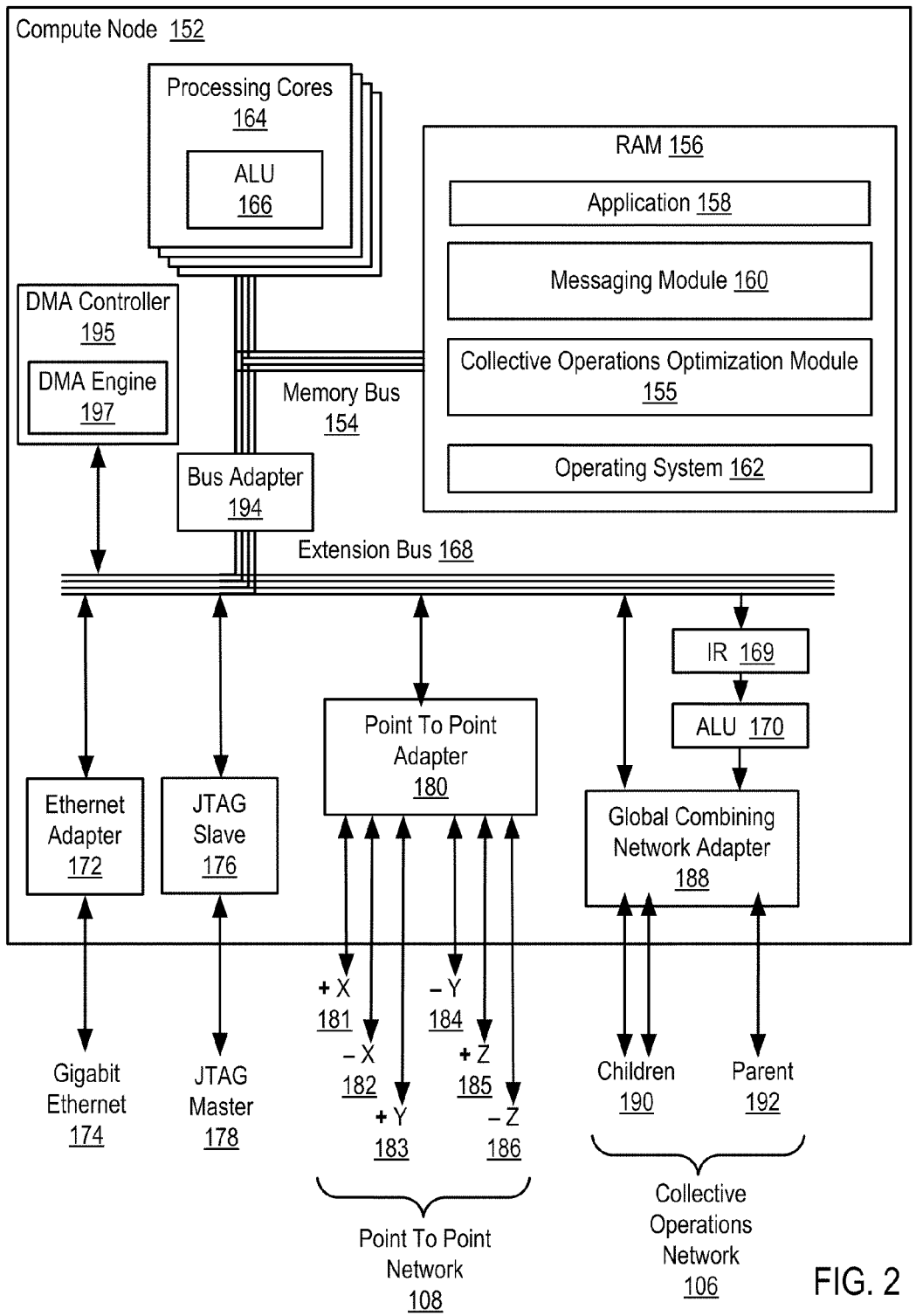
FIG. 2 sets forth a block diagram of an exemplary compute node useful in a parallel computer capable of optimizing collective operations by an operational group according to embodiments of the present invention.

The collective operations optimization module (155) of FIG. 2 is illustrated in RAM. This is for example and not for limitation. In fact, collective operations optimization modules (155) according to embodiments of the present invention may be implemented in hardware, software, or a combination of software and hardware.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems that [preamble] according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in [preamble] according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) of FIG. 2 is typically stored in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
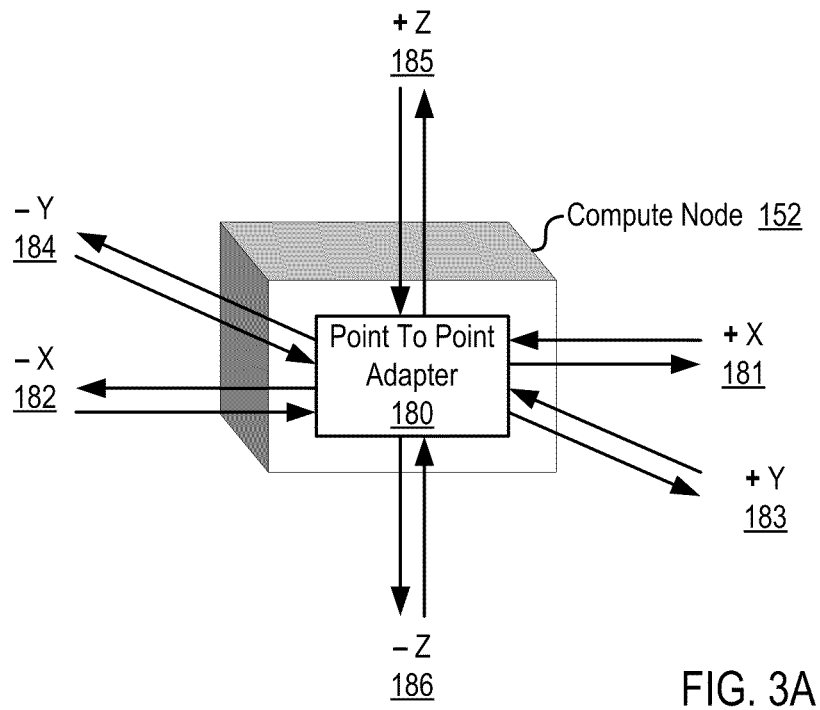
FIG. 3A illustrates an exemplary Point To Point Adapter useful in systems capable of optimizing collective operations by an operational group on a parallel computer according to embodiments of the present invention.

For further explanation, FIG. 3A illustrates an exemplary Point To Point Adapter (180) useful in systems capable of optimizing collective operations by an operational group on a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
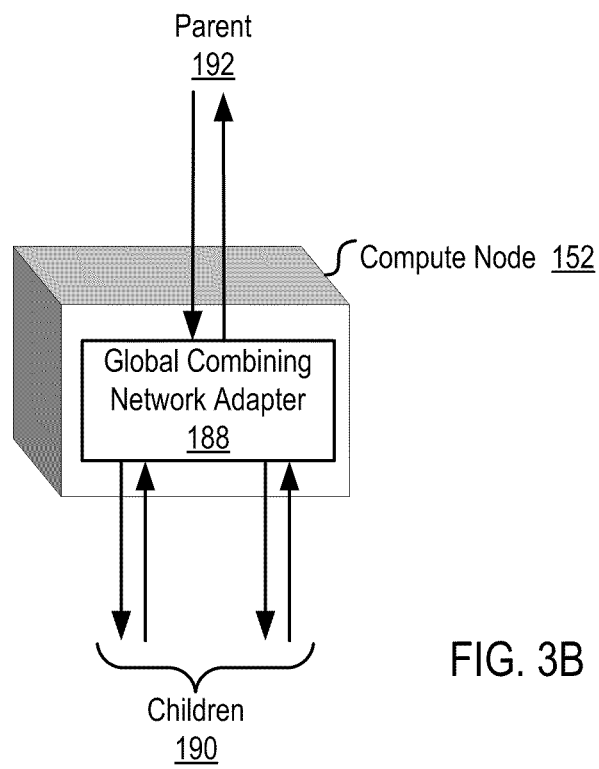
FIG. 3B illustrates an exemplary Global Combining Network Adapter useful in systems capable of optimizing collective operations by an operational group on a parallel computer according to embodiments of the present invention.

For further explanation, FIG. 3B illustrates an exemplary Global Combining Network Adapter (188) useful in systems capable of optimizing collective operations by an operational group on a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
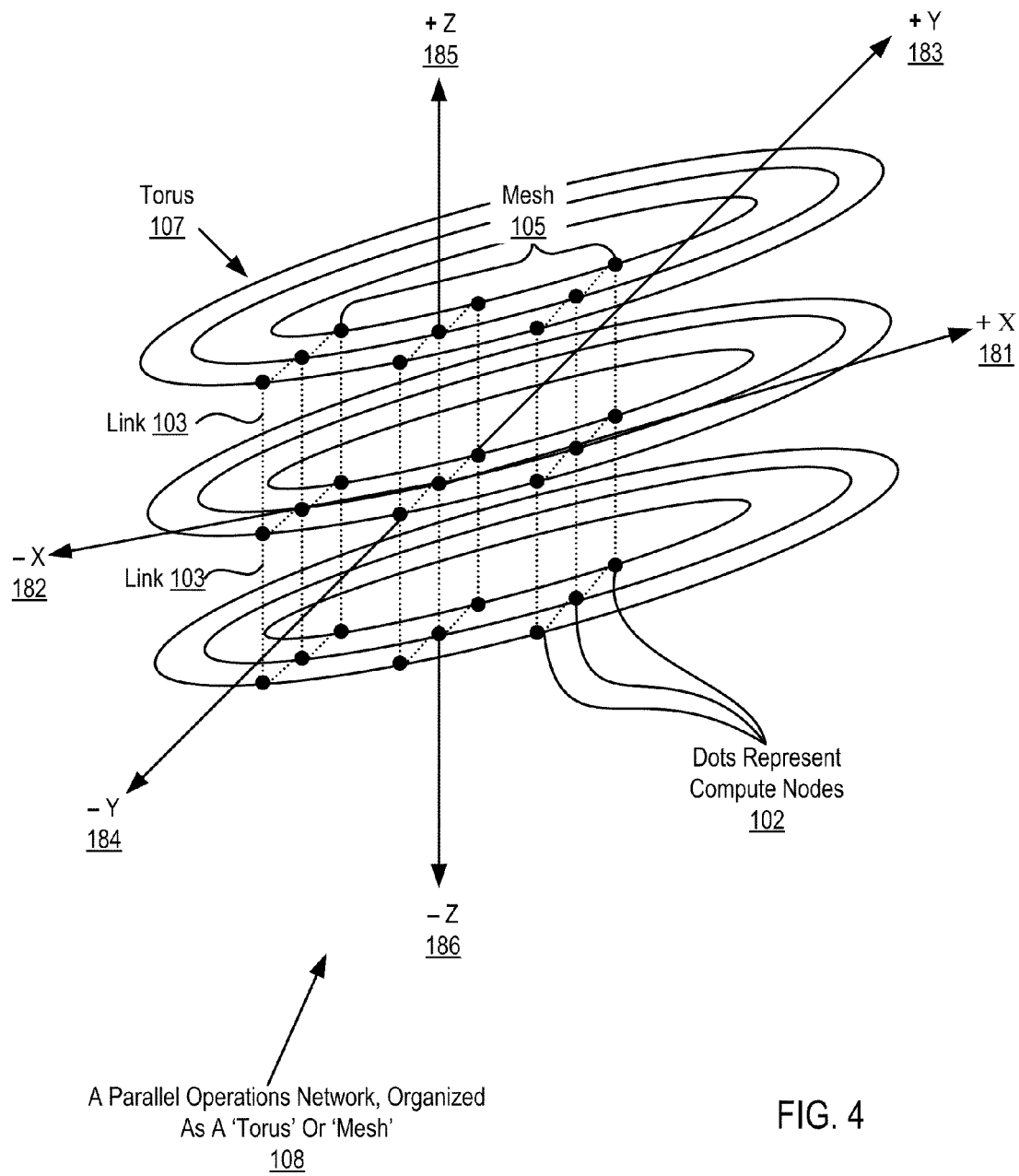
FIG. 4 sets forth a line drawing illustrating an exemplary data communications network optimized for point to point operations useful in systems capable of optimizing collective operations by an operational group on a parallel computer in accordance with embodiments of the present invention.

For further explanation, FIG. 4 sets forth a line drawing illustrating an exemplary data communications network (108) optimized for point to point operations useful in systems capable of optimizing collective operations by an operational group on a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in [preamble] in accordance with embodiments of the present invention may contain only a few compute nodes or may contain thousands of compute nodes.

Figure 5:
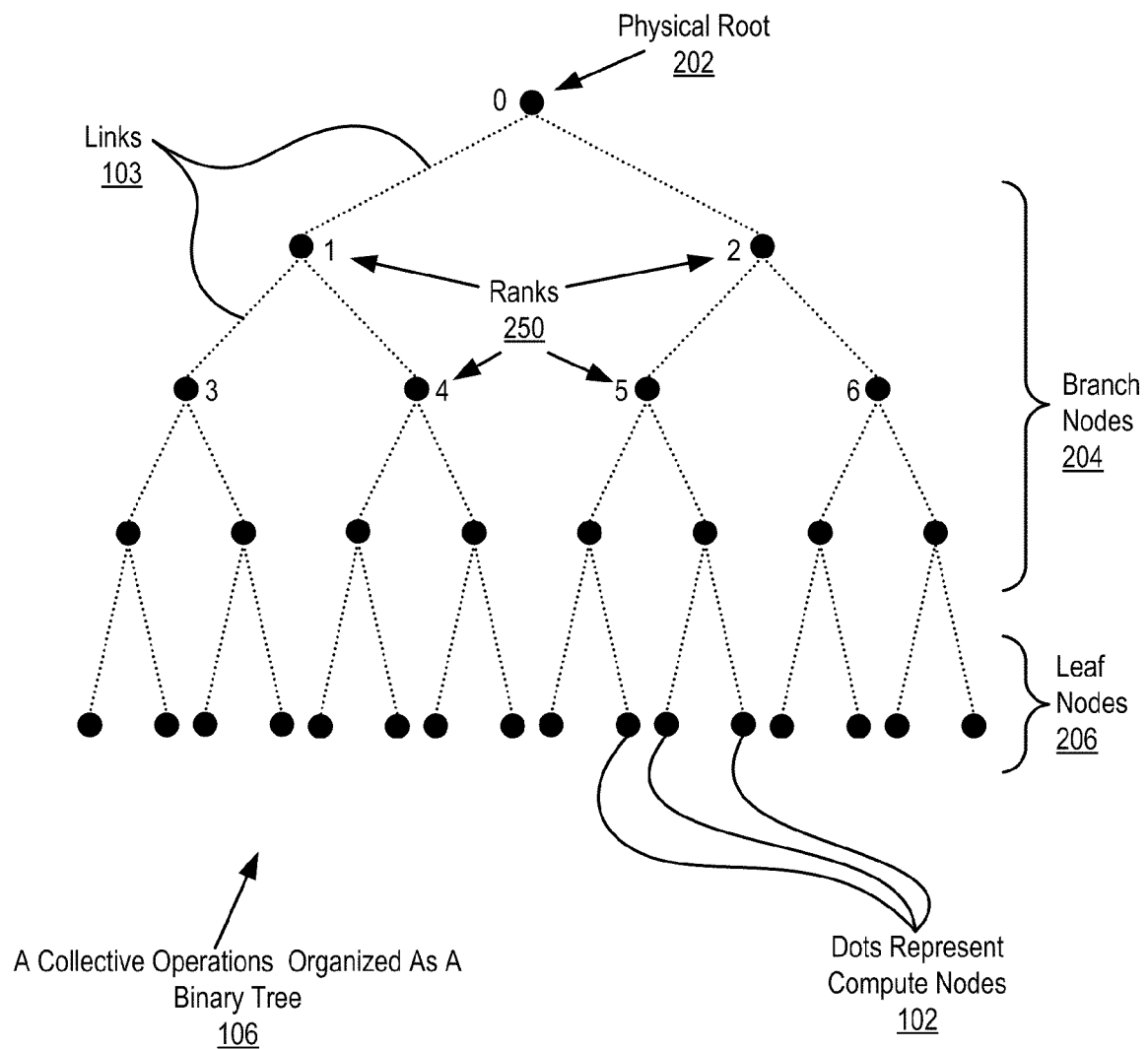
FIG. 5 sets forth a line drawing illustrating an exemplary data communications network optimized for collective operations useful in systems capable of optimizing collective operations by an operational group on a parallel computer in accordance with embodiments of the present invention.

For further explanation, FIG. 5 sets forth a line drawing illustrating an exemplary data communications network (106) optimized for collective operations useful in systems capable of optimizing collective operations by an operational group on a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for [preamble] in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
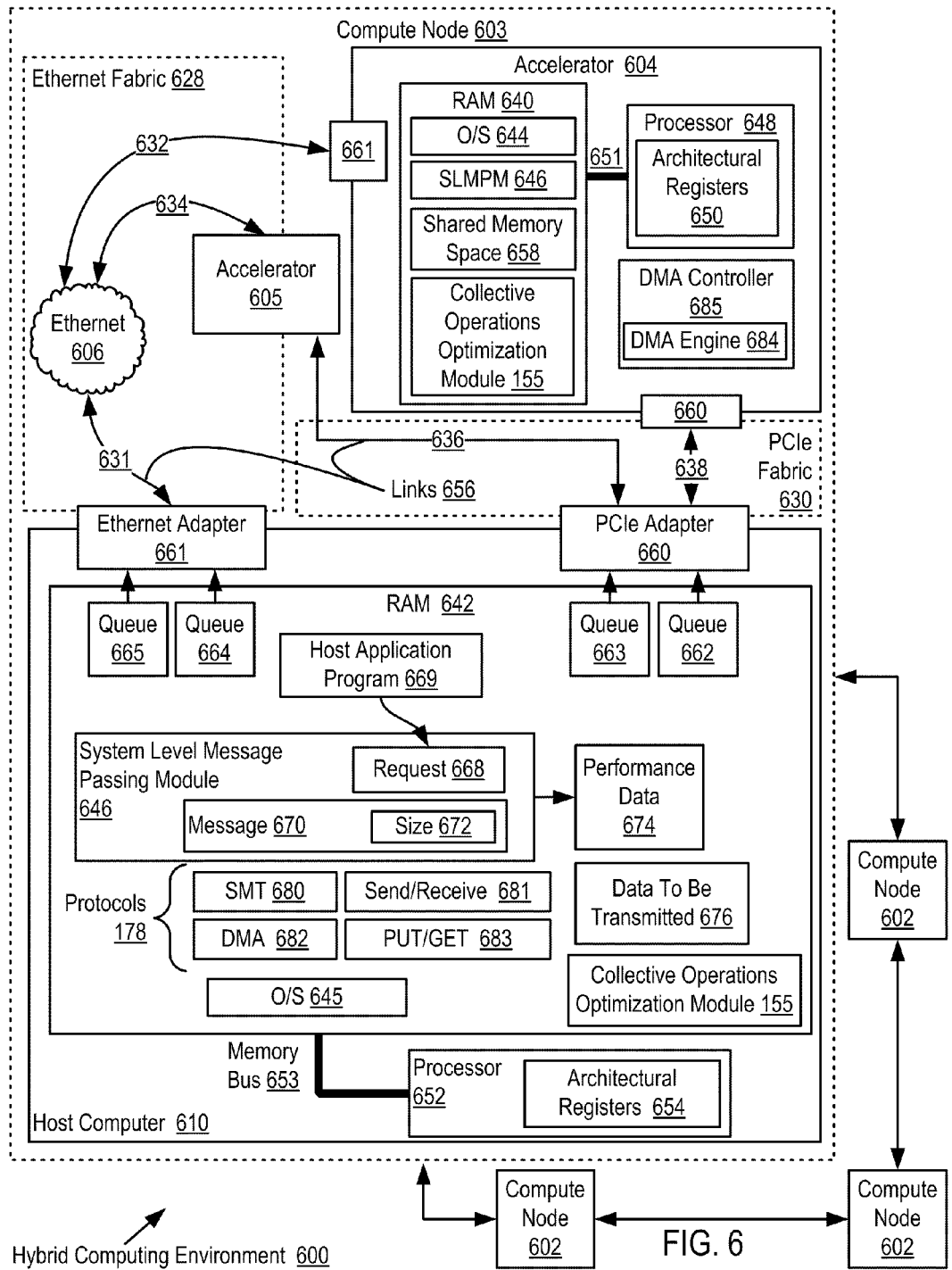
FIG. 6 sets forth a further exemplary distributed computing system for optimizing collective operations by an operational group according to embodiments of the present invention in which the distributed computing system is implemented as a hybrid computing environment.

For further explanation, FIG. 6 sets forth a further exemplary distributed computing system for optimizing collective operations by an operational group on a parallel computer according to embodiments of the present invention in which the distributed computing system is implemented as a hybrid computing environment. A 'hybrid computing environment,' as the term is used in this specification, is a computing environment in that it includes computer processors operatively coupled to computer memory so as to implement data processing in the form of execution of computer program instructions stored in the memory and executed on the processors. The hybrid computing environment (600) of FIG. 6 includes one compute node (603) that represents a small, separate hybrid computing environment which, when taken with other similar compute nodes (602), together make up a larger hybrid computing environment.

The example compute node (603) of FIG. 6 may carry out principal user-level computer program execution, accepting administrative services, such as initial program loads and the like, from a service application executing on a service node connected to the compute node (603) through a data communications network. The example compute node may also be coupled for data communications to one or more input/output (I/O) nodes that enable the compute node to gain access to data storage and other I/O functionality. The I/O nodes and service node may be connected to the example compute nodes (603), to other compute nodes (602) in the larger hybrid computing environment, and to I/O devices, through a local area network ('LAN') implemented using high-speed Ethernet or a data communications fabric of another fabric type as will occur to those of skill in the art. I/O devices useful in a larger hybrid computing environment that includes the compute node (603) may include non-volatile memory for the computing environment in the form of data storage device, an output device for the hybrid computing environment in the form of printer, and a user I/O device in the form of computer terminal that executes a service application interface that provides to a user an interface for configuring compute nodes in the hybrid computing environment and initiating execution by the compute nodes of principal user-level computer program instructions.

The compute node (603) in the example of FIG. 6 is illustrated in an expanded view to aid a more detailed explanation of a hybrid computing environment (600) that may be combined with other hybrid computing environments, such as the other compute nodes (602), to form a larger hybrid computing environment. The compute node (603) in the example of FIG. 6 includes a host computer (610). A host computer (610) is a 'host' in the sense that it is the host computer that carries out interface functions between a compute node and other components of the hybrid computing environment external to any particular compute node. That is, it is the host computer that executes initial boot procedures, power on self tests, basic I/O functions, accepts user-level program loads from service nodes, and so on.

The host computer (610) in the example of FIG. 6 includes a computer processor (652) operatively coupled to computer memory, Random Access Memory ('RAM') (642), through a high speed memory bus (653). The processor (652) in each host computer (610) has a set of architectural registers (654) that defines the host computer architecture.

The example compute node (603) of FIG. 6 also includes one or more accelerators (604, 605). An accelerator (604) is an 'accelerator' in that each accelerator has an accelerator architecture that is optimized, with respect to the host computer architecture, for speed of execution of a particular class of computing functions. Such accelerated computing functions include, for example, vector processing, floating point operations, and others as will occur to those of skill in the art. Each accelerator (604, 605) in the example of FIG. 6 includes a computer processor (648) operatively coupled to RAM (640) through a high speed memory bus (651). Stored in RAM (640, 642) of the host computer and the accelerators (604, 605) is an operating system (645). Operating systems useful in host computers and accelerators of hybrid computing environments according to embodiments of the present invention include UNIX™, Linux™, Microsoft XP™, Microsoft Vista™, Microsoft NT™, AIX™, IBM's i5/OS™, and others as will occur to those of skill in the art. There is no requirement that the operating system in the host computers should be the same operating system used on the accelerators.

The processor (648) of each accelerator (604, 605) has a set of architectural registers (650) that defines the accelerator architecture. The architectural registers (650) of the processor (648) of each accelerator are different from the architectural registers (654) of the processor (652) in the host computer (610). The architectural registers are registers that are accessible by computer program instructions that execute on each architecture, registers such as an instruction register, a program counter, memory index registers, stack pointers, and the like. With differing architectures, it would be uncommon, although possible, for a host computer and an accelerator to support the same instruction sets. As such, computer program instructions compiled for execution on the processor (648) of an accelerator (604) generally would not be expected to execute natively on the processor (652) of the host computer (610) and vice versa. Moreover, because of the typical differences in hardware architectures between host processors and accelerators, computer program instructions compiled for execution on the processor (652) of a host computer (610) generally would not be expected to execute natively on the processor (648) of an accelerator (604) even if the accelerator supported the instruction set of the host. The accelerator architecture in example of FIG. 6 is optimized, with respect to the host computer architecture, for speed of execution of a particular class of computing functions. That is, for the function or functions for which the accelerator is optimized, execution of those functions will proceed faster on the accelerator than if they were executed on the processor of the host computer.

Examples of hybrid computing environments include a data processing system that in turn includes one or more host computers, each having an x86 processor, and accelerators whose architectural registers implement the PowerPC instruction set. Computer program instructions compiled for execution on the x86 processors in the host computers cannot be executed natively by the PowerPC processors in the accelerators. Readers will recognize in addition that some of the example hybrid computing environments described in this specification are based upon the Los Alamos National Laboratory ('LANL') supercomputer architecture developed in the LANL Roadrunner project (named for the state bird of New Mexico), the supercomputer architecture that famously first generated a 'petaflop,' a million billion floating point operations per second. The LANL supercomputer architecture includes many host computers with dual-core AMD Opteron processors coupled to many accelerators with IBM Cell processors, the Opteron processors and the Cell processors having different architectures.

In the example of FIG. 6, the host computer (610) and the accelerators (604, 605) are adapted to one another for data communications by a system level message passing module ('SLMPM') (646) and two data communications fabrics (628, 630) of at least two different fabric types. A data communications fabric (628, 630) is a configuration of data communications hardware and software that implements a data communications coupling between a host computer and an accelerator. Examples of data communications fabric types include Peripheral Component Interconnect ('PCI'), PCI express ('PCIe'), Ethernet, Infiniband, Fibre Channel, Small Computer System Interface ('SCSI'), External Serial Advanced Technology Attachment ('eSATA'), Universal Serial Bus ('USB'), and so on as will occur to those of skill in the art. In the example of FIG. 6, the host computer (610) and the accelerators (604, 605) are adapted to one another for data communications by a PCIe fabric (630) through PCIe communications adapters (660) and an Ethernet fabric (628) through Ethernet communications adapters (661). The use of PCIe and Ethernet is for explanation, not for limitation of the invention. Readers of skill in the art will immediately recognize that hybrid computing environments according to embodiments of the present invention may include fabrics of other fabric types such as, for example, PCI, Infiniband, Fibre Channel, SCSI, eSATA, USB, and so on.

An SLMPM (646) is a module or library of computer program instructions that exposes an application programming interface ('API') to user-level applications for carrying out message-based data communications between the host computer (610) and the accelerator (604, 605). Examples of message-based data communications libraries that may be improved for use as an SLMPM according to embodiments of the present invention include:

the Message Passing Interface or 'MPI,' an industry standard interface in two versions, first presented at Supercomputing 1994, not sanctioned by any major standards body, the Data Communication and Synchronization interface ('DACS') of the LANL supercomputer, the POSIX Threads library ('Pthreads'), an IEEE standard for distributed, multithreaded processing, the Open Multi-Processing interface ('OpenMP'), an industry-sanctioned specification for parallel programming, and other libraries that will occur to those of skill in the art.

In this example, to support message-based data communications between the host computer (610) and the accelerator (604), both the host computer (610) and the accelerator (604) have an SLMPM (646) so that message-based communications can both originate and be received on both sides of any coupling for data communications.

The SLMPM (646) in this example operates generally for data processing in a hybrid computing environment (600) by monitoring data communications performance for a plurality of data communications modes between the host computer (610) and the accelerators (604, 605), receiving a request (668) to transmit data according to a data communications mode from the host computer to an accelerator, determining whether to transmit the data according to the requested data communications mode, and if the data is not to be transmitted according to the requested data communications mode: selecting another data communications mode and transmitting the data according to the selected data communications mode. In the example of FIG. 6, the monitored performance is illustrated as monitored performance data (674) stored by the SLMPM (646) in RAM (642) of the host computer (610) during operation of the compute node (603).

A data communications mode specifies a data communications fabric type, a data communications link, and a data communications protocol (678). A data communications link (656) is data communications connection between a host computer and an accelerator. In the example of FIG. 6, a link (656) between the host computer (610) and the accelerator (604) may include the PCIe connection (638) or the Ethernet connection (631, 632) through the Ethernet network (606). A link (656) between the host computer (610) and the accelerator (605) in the example of FIG. 6, may include the PCIe connection (636) or the Ethernet connection (631, 634) through the Ethernet network (606). Although only one link for each fabric type is illustrated between the host computer and the accelerator in the example of FIG. 6, readers of skill in the art will immediately recognize that there may any number of links for each fabric type.

A data communications protocol is a set of standard rules for data representation, signaling, authentication and error detection required to send information from a host computer (610) to an accelerator (604). In the example of FIG. 6, the SLMPM (646) may select one of several protocols (678) for data communications between the host computer (610) and the accelerator. Examples of such protocols (678) include shared memory transfers ('SMT') (680) executed with a send and receive operations (681), and direct memory access ('DMA') (682) executed with PUT and GET operations (683).

Shared memory transfer is a data communications protocol for passing data between a host computer and an accelerator into shared memory space (658) allocated for such a purpose such that only one instance of the data resides in memory at any time. Consider the following as an example shared memory transfer between the host computer (610) and the accelerator (604) of FIG. 6. An application (669) requests (668) a transmission of data (676) from the host computer (610) to the accelerator (604) in accordance with the SMT (680) protocol. Such a request (668) may include a memory address allocated for such shared memory. In this example, the shared memory segment (658) is illustrated in a memory location on the accelerator (604), but readers will recognize that shared memory segments may be located on the accelerator (604), on the host computer (610), on both the host computer and the accelerator, or even off the local compute node (603) entirely—so long as the segment is accessible as needed by the host and the accelerator. To carry out a shared memory transfer, the SLMPM (646) on the host computer (610) establishes a data communications connection with the SLMPM (646) executing on the accelerator (604) by a handshaking procedure similar to that in the TCP protocol. The SLMPM (646) then creates a message (670) that includes a header and a payload data and inserts the message into a message transmit queue for a particular link of a particular fabric. In creating the message, the SLMPM inserts, in the header of the message, an identification of the accelerator and an identification of a process executing on the accelerator. The SLMPM also inserts the memory address from the request (668) into the message, either in the header or as part of the payload data. The SLMPM also inserts the data (676) to be transmitted in the message (670) as part of the message payload data. The message is then transmitted by a communications adapter (660, 661) across a fabric (628, 630) to the SLMPM executing on the accelerator (604) where the SLMPM stores the payload data, the data (676) that was transmitted, in shared memory space (658) in RAM (640) in accordance with the memory address in the message.

Direct memory access ('DMA') is a data communications protocol for passing data between a host computer and an accelerator with reduced operational burden on the computer processor (652). A DMA transfer essentially effects a copy of a block of memory from one location to another, typically from a host computer to an accelerator or vice versa. Either or both a host computer and accelerator may include DMA controller and DMA engine, an aggregation of computer hardware and software for direct memory access. Direct memory access includes reading and writing to memory of accelerators and host computers with reduced operational burden on their processors. A DMA engine of an accelerator, for example, may write to or read from memory allocated for DMA purposes, while the processor of the accelerator executes computer program instructions, or otherwise continues to operate. That is, a computer processor may issue an instruction to execute a DMA transfer, but the DMA engine, not the processor, carries out the transfer.

In the example of FIG. 6, only the accelerator (604) includes a DMA controller (685) and DMA engine (684) while the host computer does not. In this embodiment the processor (652) on the host computer initiates a DMA transfer of data from the host to the accelerator by sending a message according to the SMT protocol to the accelerator, instructing the accelerator to perform a remote 'GET' operation. The configuration illustrated in the example of FIG. 6 in which the accelerator (604) is the only device containing a DMA engine is for explanation only, not for limitation. Readers of skill in the art will immediately recognize that in many embodiments, both a host computer and an accelerator may include a DMA controller and DMA engine, while in yet other embodiments only a host computer includes a DMA controller and DMA engine.

To implement a DMA protocol in the hybrid computing environment of FIG. 6 some memory region is allocated for access by the DMA engine. Allocating such memory may be carried out independently from other accelerators or host computers, or may be initiated by and completed in cooperation with another accelerator or host computer. Shared memory regions, allocated according to the SMA protocol, for example, may be memory regions made available to a DMA engine. That is, the initial setup and implementation of DMA data communications in the hybrid computing environment (600) of FIG. 6 may be carried out, at least in part, through shared memory transfers or another out-of-band data communications protocol, out-of-band with respect to a DMA engine. Allocation of memory to implement DMA transfers is relatively high in latency, but once allocated, the DMA protocol provides for high bandwidth data communications that requires less processor utilization than many other data communications protocols.

A direct 'PUT' operation is a mode of transmitting data from a DMA engine on an origin device to a DMA engine on a target device. A direct 'PUT' operation allows data to be transmitted and stored on the target device with little involvement from the target device's processor. To effect minimal involvement from the target device's processor in the direct 'PUT' operation, the origin DMA engine transfers the data to be stored on the target device along with a specific identification of a storage location on the target device. The origin DMA knows the specific storage location on the target device because the specific storage location for storing the data on the target device has been previously provided by the target DMA engine to the origin DMA engine.

A remote 'GET' operation, sometimes denominated an 'rGET,' is another mode of transmitting data from a DMA engine on an origin device to a DMA engine on a target device. A remote 'GET' operation allows data to be transmitted and stored on the target device with little involvement from the origin device's processor. To effect minimal involvement from the origin device's processor in the remote 'GET' operation, the origin DMA engine stores the data in an storage location accessible by the target DMA engine, notifies the target DMA engine, directly or out-of-band through a shared memory transmission, of the storage location and the size of the data ready to be transmitted, and the target DMA engine retrieves the data from storage location.

Monitoring data communications performance for a plurality of data communications modes may include monitoring a number of requests (668) in a message transmit request queue (662-165) for a data communications link (656). In the example of FIG. 6, each message transmit request queue (662-165) is associated with one particular data communications link (656). Each queue (662-165) includes entries for messages (670) that include data (676) to be transmitted by the communications adapters (660, 661) along a data communications link (656) associated with queue.

Monitoring data communications performance for a plurality of data communications modes may also include monitoring utilization of a shared memory space (658). In the example of FIG. 6, shared memory space (658) is allocated in RAM (640) of the accelerator. Utilization is the proportion of the allocated shared memory space to which data has been stored for sending to a target device and has not yet been read or received by the target device, monitored by tracking the writes and reads to and from the allocated shared memory. In the hybrid computing environment (600) of FIG. 6, shared memory space, any memory in fact, is limited. As such, a shared memory space (658) may be filled during execution of an application program (669) such that transmission of data from the host computer (610) to an accelerator may be slowed, or even stopped, due to space limitations in the shared memory space.

In some embodiments of the present invention, the hybrid computing environment (600) of FIG. 6 may be configured to operate as a parallel computing environment in which two or more instances the application program (669) executes on two or more host computers (610) in the parallel computing environment. In such embodiments, monitoring data communications performance across data communications modes may also include aggregating data communications performance information (674) across a plurality of instances of the application program (669) executing on two or more host computers in a parallel computing environment. The aggregated performance information (674) may be used to calculate average communications latencies for data communications modes, average number of requests in data communications links of a particular fabric type, average shared memory utilization among the plurality of host computers and accelerators in the parallel computing environment, and so on as will occur to those of skill in the art. Any combination of such measures may be used by the SLMPM for both determining whether to transmit the data according to requested data communications mode and selecting another data communications mode for transmitting the data if the data is not to be transmitted according to the requested data communications mode.

The SLMPM (646) of FIG. 6 receives, from an application program (669) on the host computer (610), a request (668) to transmit data (676) according to a data communications mode from the host computer (610) to the accelerator (604). Such data (676) may include computer program instructions compiled for execution by the accelerator (604), such as an executable file of an accelerator application program, work piece data for an accelerator application program, files necessary for execution of an accelerator application program, such as libraries, databases, drivers, and the like. Receiving a request (668) to transmit data (676) according to a data communications mode may include receiving a request to transmit data by a specified fabric type, receiving a request to transmit data through a specified data communications link from the host computer to the accelerator, or receiving a request to transmit data from the host computer to the accelerator according to a protocol.

A request (668) to transmit data (676) according to a data communications mode may be implemented as a user-level application function call through an API to the SLMPM (646), a call that expressly specifies a data communications mode according to protocol, fabric type, and link. A request implemented as a function call may specify a protocol according to the operation of the function call itself. A dacs_put( ) function call, for example, may represent a call through an API exposed by an SLMPM implemented as a DACS library to transmit data in the default mode of a DMA 'PUT' operation. Such a call, from the perspective of the calling application and the programmer who wrote the calling application, represents a request to the SLMPM library to transmit data according to the default mode, known to the programmer to be default mode associated with the express API call. The called function, in this example dacs_put( ), may be coded in embodiments with multiple fabric types, protocols, and links, to make its own determination whether to transmit the data according to the requested data communications mode, that is, according to the default mode of the called function. In a further example, a dacs_send( ) instruction may represent a call through an API exposed by an SLMPM implemented as a DACS library to transmit data in the default mode of an SMT 'send' operation, where the called function dacs_send( ) is again coded in embodiments with multiple fabric types, protocols, and links, to make its own determination whether to transmit the data according to the requested mode.

An identification of a particular accelerator in a function call may effectively specify a fabric type. Such a function call may include as a call parameters an identification of a particular accelerator. An identification of a particular accelerator by use of a PCIe ID, for example, effectively specifies a PCI fabric type. In another, similar, example, an identification of a particular accelerator by use of a media access control ('MAC') address of an Ethernet adapter effectively specifies the Ethernet fabric type. Instead of implementing the accelerator ID of the function call from an application executing on the host in such a way as to specify a fabric type, the function call may only include a globally unique identification of the particular accelerator as a parameter of the call, thereby specifying only a link from the host computer to the accelerator, not a fabric type. In this case, the function called may implement a default fabric type for use with a particular protocol. If the function called in the SLMPM is configured with PCIe as a default fabric type for use with the DMA protocol, for example, and the SLMPM receives a request to transmit data to the accelerator (604) according to the DMA protocol, a DMA PUT or DMA remote GET operation, the function called explicitly specifies the default fabric type for DMA, the PCIe fabric type.

In hybrid computing environments in which only one link of each fabric type adapts a single host computer to a single accelerator, the identification of a particular accelerator in a parameter of a function call, may also effectively specify a link. In hybrid computing environments where more than one link of each fabric type adapts a host computer and an accelerator, such as two PCIe links connecting the host computer (610) to the accelerator (604), the SLMPM function called may implement a default link for the accelerator identified in the parameter of the function call for the fabric type specified by the identification of the accelerator.

The SLMPM (646) in the example of FIG. 6 also determines, in dependence upon the monitored performance (674), whether to transmit the data (676) according to the requested data communications mode. Determining whether to transmit the data (676) according to the requested data communications mode may include determining whether to transmit data by a requested fabric type, whether to transmit data through a requested data communications link, or whether to transmit data according to a requested protocol.

In hybrid computing environments according to embodiments of the present invention, where monitoring data communications performance across data communications modes includes monitoring a number of requests in a message transmit request queue (662-165) for a data communications link, determining whether to transmit the data (676) according to the requested data communications mode may be carried out by determining whether the number of requests in the message transmit request queue exceeds a predetermined threshold. In hybrid computing environments according to embodiments of the present invention, where monitoring data communications performance for a plurality of data communications modes includes monitoring utilization of a shared memory space, determining whether to transmit the data (676) according to the requested data communications mode may be carried out by determining whether the utilization of the shared memory space exceeds a predetermined threshold.

If the data is not to be transmitted according to the requested data communications mode, the SLMPM (646)

selects, in dependence upon the monitored performance, another data communications mode for transmitting the data and transmits the data (676) according to the selected data communications mode. Selecting another data communications mode for transmitting the data may include selecting, in dependence upon the monitored performance, another data communications fabric type by which to transmit the data, selecting a data communications link through which to transmit the data, and selecting another data communications protocol. Consider as an example, that the requested data communications mode is a DMA transmission using a PUT operation through link (638) of the PCIe fabric (630) to the accelerator (604). If the monitored data performance (674) indicates that the number of requests in transmit message request queue (662) associated with the link (638) exceeds a predetermined threshold, the SLMPM may select another fabric type, the Ethernet fabric (628), and link (631, 632) through which to transmit the data (676). Also consider that the monitored performance (676) indicates that current utilization of the shared memory space (658) is less than a predetermined threshold while the number of outstanding DMA transmissions in the queue (662) exceeds a predetermined threshold. In such a case, the SLMPM (646) may also select another protocol, such as a shared memory transfer, by which to transmit the data (674).

Selecting, by the SLMPM, another data communications mode for transmitting the data (672) may also include selecting a data communications protocol (678) in dependence upon data communications message size (672). Selecting a data communications protocol (678) in dependence upon data communications message size (672) may be carried out by determining whether a size of a message exceeds a predetermined threshold. For larger messages (670), the DMA protocol may be a preferred protocol as processor utilization in making a DMA transfer of a larger message (670) is typically less than the processor utilization in making a shared memory transfer of a message of the same size.

As mentioned above, the SLMPM may also transmit the data according to the selected data communications mode. Transmit the data according to the selected data communications mode may include transmitting the data by the selected data communications fabric type, transmitting the data through the selected data communications link, or transmitting the data according to the selected protocol. The SLMPM (646) may effect a transmission of the data according to the selected data communications mode by instructing, through a device driver, the communications adapter for the data communications fabric type of the selected data communications mode to transmit the message (670) according to a protocol of the selected data communications mode, where the message includes in a message header, an identification of the accelerator, and in the message payload, the data (676) to be transmitted.

In the example of FIG. 6 stored in RAM (640) on the accelerator (604) and also stored in RAM on the host computer (603) is a collective operations optimization module (155), a module of automated computing machinery for optimizing collective operations by an operational group on a parallel computer according to embodiments of the present invention. In the example of FIG. 6, the collective operations optimization module is stored in RAM on both the accelerator and the host computer to illustrate that such a module according to embodiments of the present invention may be stored on and executed by either the accelerator, the host computer, or both the accelerator and the host computer as will occur to those of skill in the art. The collective operations optimization module is a module of automated computing machinery capable of receiving, by each of the nodes in the operational group, an instruction to perform a collective operation type; selecting, by each of the nodes in the operational group from a list of optimized collective operations, an optimized collective operation for the collective operation type; performing, by each of the nodes in the operational group, the selected optimized collective operation; determining, by one or more of the nodes in the operational group, whether a resource needed by the one or more nodes to perform the collective operation is not available; if a resource needed by the one or more nodes to perform the collective operation is not available: notifying, by one or more of the nodes in the operational group, the other nodes that the resource is not available; selecting, by each of the nodes in the operational group from the list of optimized collective operations, a next optimized collective operation; and performing, by each of the nodes in the operational group, the next optimized collective operation.

Figure 7:
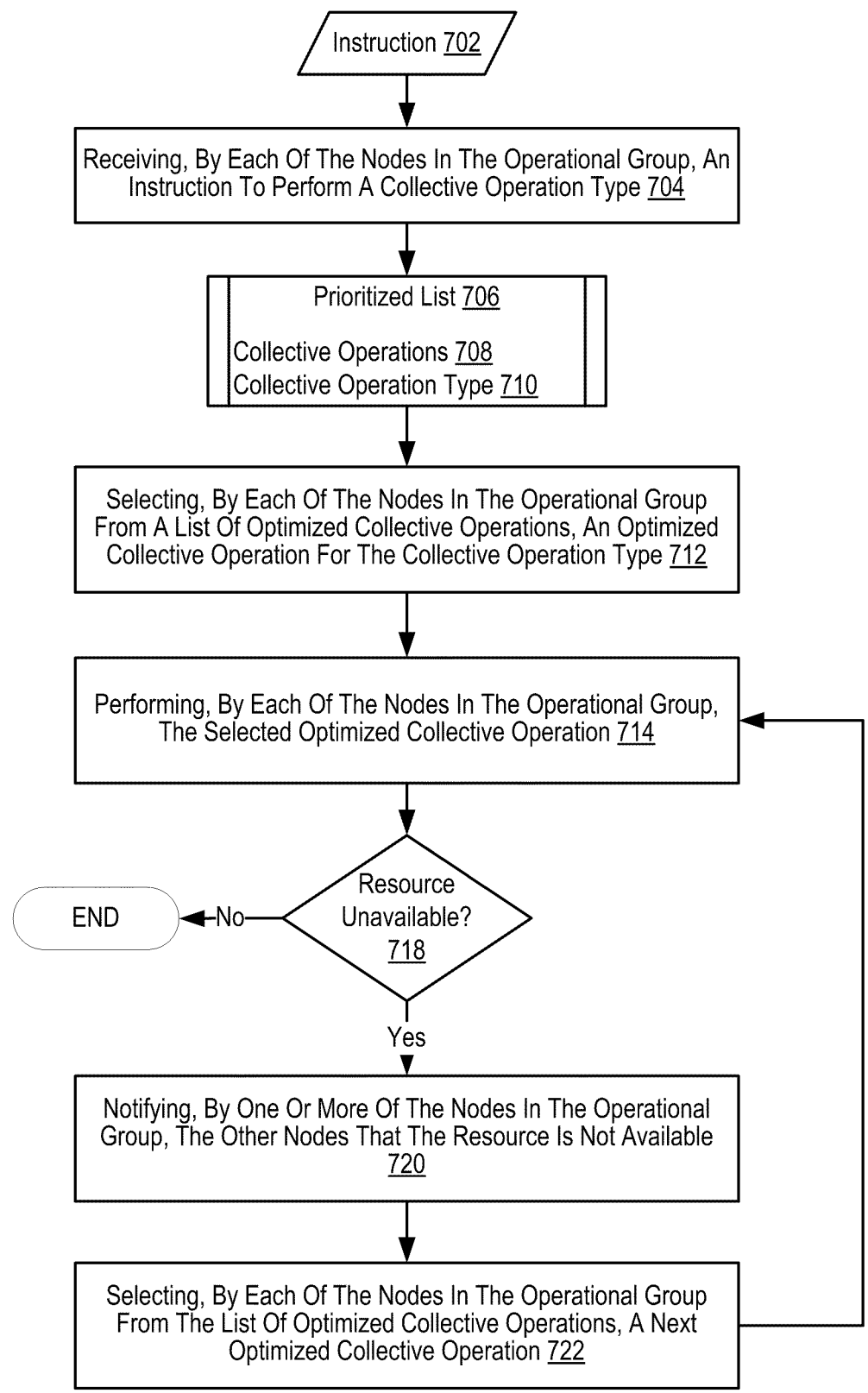
FIG. 7 sets forth an exemplary method of optimizing collective operations by an operational group on a parallel computer according to embodiments of the present invention.

For further explanation, FIG. 7 sets forth an exemplary method of for optimizing collective operations by an operational group on a parallel computer according to embodiments of the present invention. The method of FIG. 7 may be carried out in a distributed computing system similar to the example distributed computing systems described above: the example parallel computers of FIGS. 1-5, the example hybrid computing environment of FIG. 6, and others as will occur to those of skill in the art. As discussed above, an operational group in the example of FIG. 7 is implemented as a plurality of compute nodes that will perform one or more collective operations.

The method of FIG. 7 includes receiving (704), by each of the nodes in the operational group, an instruction (702) to perform a collective operation type. As mentioned above, a collective operation is an operation, a message-passing computer program instruction that is executed simultaneously, that is, at approximately the same time, by all the compute nodes in an operational group of compute nodes. A collective operation type is category of collective operations. Examples of such collective operation types include broadcast, gather, scatter, and reduce. Within each of these types of collective operations an operational group may be able to perform many different versions of collective operations of that particular collective operation type. For example, the operational group may be able to perform many different scatter operations each varying in the manner in which the scatter is performed, such as for example, differing in the manner in which class routes are used for the collective operation. Often, depending on the geometry of the operational group, that is, the topology in which the operational group is implemented, one or more versions of a collective operation of a collective operation type may be preferred over other versions.

Often the logical root of the operational group initiates a collective operation. Receiving (704), by each of the nodes in the operational group, an instruction (702) to perform a collective operation type therefore may be carried out by receiving an instruction to perform a collective operation type from the logical root of the operational group.

The method of FIG. 7 includes selecting (712), by each of the nodes in the operational group from a prioritized list (708) of optimized collective operations (708), an optimized collective operation (708) for the collective operation type (710). Selecting (712) an optimized collective operation (708) for the collective operation type (710) may include receiving by each node in the operational group information concerning the geometry of the operational group and selecting a particular optimized collective operation in dependence upon the geometry. In such cases, each compute node of the operational group may maintain a list of identifications of collective operations by operation type that are prioritized in dependence upon aspects of geometry for operational groups. Each compute node in the example of FIG. 1 has the same information and list and therefore selects the same optimized collective operation.

The method of FIG. 7 also includes performing (714), by each of the nodes in the operational group, the selected optimized collective operation (708). Performing (714), by each of the nodes in the operational group, the selected optimized collective operation (708) may be carried by executing a message-passing computer program instruction simultaneously, that is, at approximately the same time, by all the compute nodes in the operational group.

In some cases, performing the collective operation fails. That is, one or more of the computer nodes of the operational nodes does not have a resource required to properly execute the collective operation. The method of FIG. 7 therefore also includes determining (718), by one or more of the nodes in the operational group, whether a resource needed by the one or more nodes to perform the collective operation is not available. Examples that may cause the collective operation to fail include one or more invalid class routes, a link failure on a link of one or more nodes, a hardware fault on one or more of the compute nodes and others as will occur to those of skill in the art. Determining (718), by one or more of the nodes in the operational group, whether a resource needed by the one or more nodes to perform the collective operation is not available may be carried out by identifying an invalid class route, identifying a link failure on a link adjacent to the one or more nodes, identifying a hardware failure, and identifying other resources that are not available to one or more compute nodes that are needed to properly perform the collective operation as will occur to those of skill in the art.

If a resource needed by the one or more nodes to perform the collective operation is not available, the method of FIG. 7 also includes notifying (720), by one or more of the nodes in the operational group, the other nodes that the resource is not available. Notifying (720), by one or more of the nodes in the operational group, the other nodes that the resource is not available may be carried out by sending a message from each node that has a resource unavailable to every other node in the operational group. Such a message contains information notifying each node of the operational group that the selected collective operation was not performed properly.

If a resource needed by the one or more nodes to perform the collective operation is not available, the method of FIG. 7 also includes selecting (722), by each of the nodes in the operational group from the list of optimized collective operations, a next optimized collective operation and performing (714), by each of the nodes in the operational group, the next optimized collective operation. Selecting (722), by each of the nodes in the operational group from the list of optimized collective operations, a next optimized collective operation is typically carried out by selecting an identification of the next most prioritized collective operation from the list. Performing (714), by each of the nodes in the operational group, the selected optimized collective operation (708) may carried by executing a message-passing computer program instruction simultaneously, that is, at approximately the same time, by all the compute nodes in the operational group. In the method of FIG. 7, selecting (722), by each of the nodes in the operational group from the list of optimized collective operations, a next optimized collective operation and performing (714), by each of the nodes in the operational group, the next optimized collective operation may be repeated until a collective operation is performed correctly, until each compute node has no more collective operations on the list, or until a threshold number of collective operations are performed.

Often data in a source buffer is used and written over during the execution of a collective operation. As such, of a collective operation that is not performed correctly may corrupt that data in the source buffer. For further explanation, FIG. 8 sets forth another exemplary method of for optimizing collective operations by an operational group on a parallel computer according to embodiments of the present invention that preserves the input values for the collective operation. The method of FIG. 8 is similar to the method of FIG. 7 in that the method of FIG. 8 includes receiving (704), by each of the nodes in the operational group, an instruction to perform a collective operation type; selecting (712), by each of the nodes in the operational group from a list of optimized collective operations, an optimized collective operation for the collective operation type; performing (714), by each of the nodes in the operational group, the selected optimized collective operation; determining (718), by one or more of the nodes in the operational group, whether a resource needed by the one or more nodes to perform the collective operation is not available; and if a resource needed by the one or more nodes to perform the collective operation is not available, notifying (720), by one or more of the nodes in the operational group, the other nodes that the resource is not available; selecting (722), by each of the nodes in the operational group from the list of optimized collective operations, a next optimized collective operation; and performing (714), by each of the nodes in the operational group, the next optimized collective operation.

Figure 8:
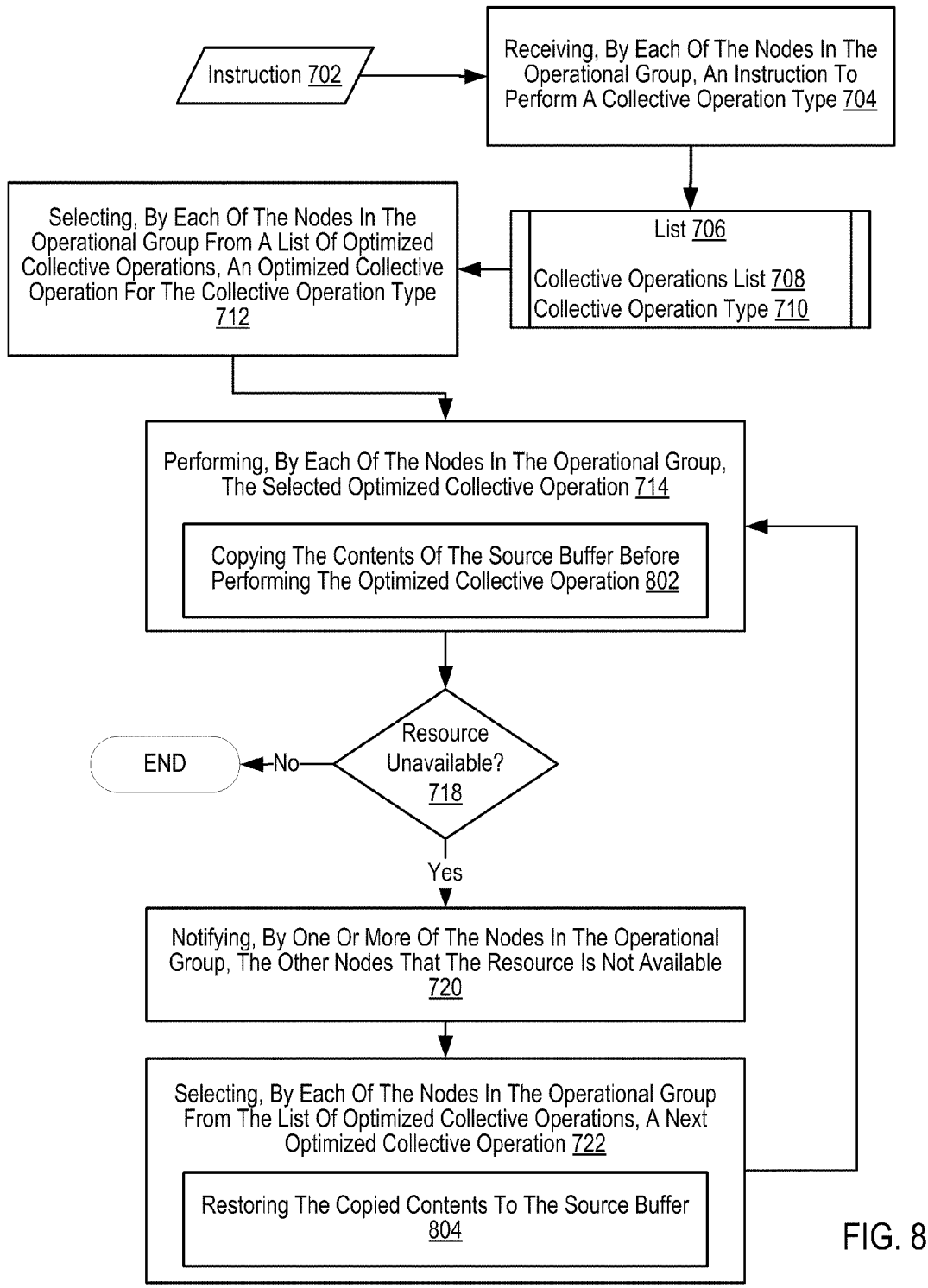
FIG. 8 sets forth another exemplary method of for optimizing collective operations by an operational group on a parallel computer according to embodiments of the present invention that preserves the input values for the collective operation.

In the example of FIG. 8 the selected optimized collective operation is an in-place operation. An in-place operation is an operation that writes the output or interim result in one or more memory locations of one or more of the inputs to the operation. While in-place operations are efficient uses of memory, the value of the input of the operation may be lost if the operation is not performed correctly. In the example of FIG. 8, therefore, performing (714) the selected optimized collective operation includes copying (802) the contents of the source buffer before performing the optimized collective operation. A source buffer is a buffer containing the values of the inputs to the collective operation. Copying (802) the contents of the source buffer before performing the optimized collective operation may be carried out by writing the contents of the source buffer to a well-known memory location such that the contents of the source buffer may be restored if the optimized collective operation is not performed correctly.

In the example of FIG. 8, selecting (722) a next optimized collective operation includes restoring (804) the copied contents to the source buffer. Restoring (804) the copied contents to the source buffer may be carried out by reading the contents of a well-known memory location where the source buffer was previously copied and writing the contents of that well-known memory location in the source buffer.

Figure 9:
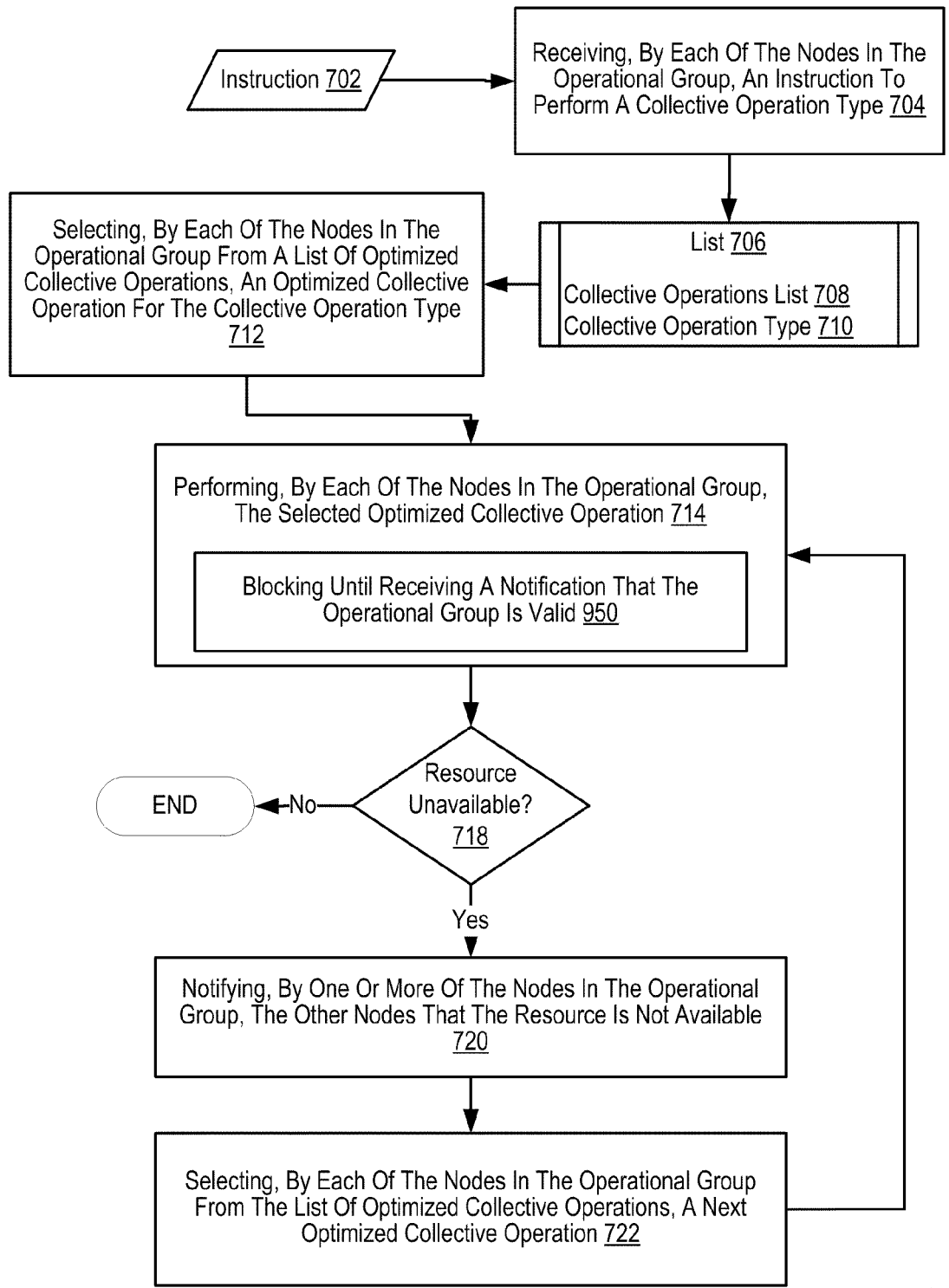
FIG. 9 sets forth another exemplary method of for optimizing collective operations by an operational group on a parallel computer according to embodiments of the present invention.

For further explanation, FIG. 9 sets forth another exemplary method for optimizing collective operations by an operational group on a parallel computer according to embodiments of the present invention. The method of FIG. 9 is similar to the method of FIG. 7 in that the method of FIG. 9 includes receiving (704), by each of the nodes in the operational group, an instruction to perform a collective operation type; selecting (712), by each of the nodes in the operational group from a list of optimized collective operations, an optimized collective operation for the collective operation type; performing (714), by each of the nodes in the operational group, the selected optimized collective operation; determining (718), by one or more of the nodes in the operational group, whether a resource needed by the one or more nodes to perform the collective operation is not available; and if a resource needed by the one or more nodes to perform the collective operation is not available, notifying (720), by one or more of the nodes in the operational group, the other nodes that the resource is not available; selecting (722), by each of the nodes in the operational group from the list of optimized collective operations, a next optimized collective operation; and performing (714), by each of the nodes in the operational group, the next optimized collective operation.

In the example of FIG. 9, the selected optimized collective operation is also an in-place operation and performing (714) the selected optimized collective operation includes blocking (950) until receiving a notification that the operational group is valid. A valid operational group is an operation group whose geometry supports execution of the optimized collective operation. Blocking (950) until receiving a notification that the operational group is valid may be carried out by waiting for a notification that the operational group is valid until executing the optimized collective operation. Determining whether a particular geometry and operational group is valid may be performed by one or more of the nodes of the operational group. Such an operation may be carried out through another collective operation, such a simple operation with a known result if the operation is performed correctly. Upon determining that the operational group is valid, the one or more nodes determining the validity of the operational group may send a message to all other nodes in the operational group informing those nodes that the operational group is valid and the optimized collective operation may be performed.

Figure 10:
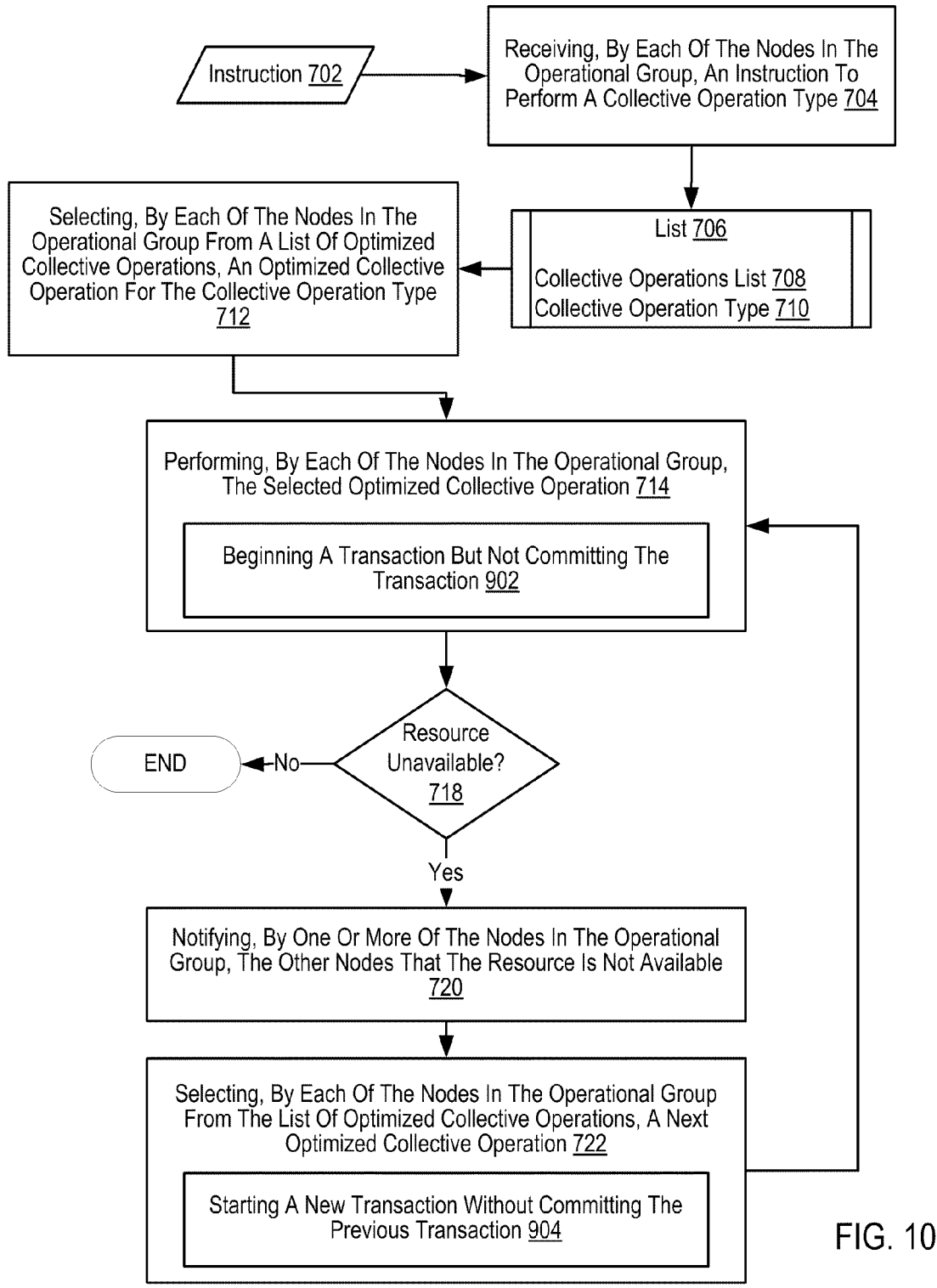
FIG. 10 sets forth another exemplary method of for optimizing collective operations by an operational group on a parallel computer according to embodiments of the present invention.

For further explanation, FIG. 10 sets forth another exemplary method for optimizing collective operations by an operational group on a parallel computer according to embodiments of the present invention. The method of FIG. 10 is similar to the method of FIG. 7 in that the method of FIG. 10 includes receiving (704), by each of the nodes in the operational group, an instruction to perform a collective operation type; selecting (712), by each of the nodes in the operational group from a list of optimized collective operations, an optimized collective operation for the collective operation type; performing (714), by each of the nodes in the operational group, the selected optimized collective operation; determining (718), by one or more of the nodes in the operational group, whether a resource needed by the one or more nodes to perform the collective operation is not available; and if a resource needed by the one or more nodes to perform the collective operation is not available, notifying (720), by one or more of the nodes in the operational group, the other nodes that the resource is not available; selecting (722), by each of the nodes in the operational group from the list of optimized collective operations, a next optimized collective operation; and performing (714), by each of the nodes in the operational group, the next optimized collective operation.

In the example of FIG. 10, the one or more of the nodes of the operational group supports transactional memory. Transactional memory simplifies parallel programming by allowing a group of load and store instructions to execute in an atomic way for controlling access to shared memory in concurrent computing. A transaction that is not committed, that is, completed, does not write over the data that is the input to the collective operation in a source buffer. Therefore, in collective operations on an operational group that supports transactional memory, if the collective operation is not performed correctly the data in the source buffers is preserved if the transaction is not committed.

In the example of FIG. 10, performing (714) the collective operation includes beginning (902) a transaction but not committing the transaction and selecting (722) a next optimized collective operation includes starting (904) a new transaction without committing the previous transaction. Beginning (902) a transaction but not committing the transaction and starting (904) a new transaction without committing the previous transaction may be carried out through the use of a transactional memory module implemented either as software, hardware, or both hardware and software. In such cases, if the optimized collective operation is not correctly performed the transaction is not committed thereby preserving the values of the inputs of the collective operation. Similarly, in the example of FIG. 10, As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of optimizing collective operations by an operational group on a parallel computer, wherein the operational group comprises a plurality of compute nodes, the method comprising:

receiving, by each of the nodes in the operational group, an instruction to perform a collective operation type;

selecting, by each of the nodes in the operational group from a list of optimized collective operations, an optimized collective operation for the collective operation type;

performing, by each of the nodes in the operational group, the selected optimized collective operation;

determining, by one or more of the nodes in the operational group, whether a resource needed by the one or more nodes to perform the collective operation is not available;

if a resource needed by the one or more nodes to perform the collective operation is not available:

notifying, by one or more of the nodes in the operational group, the other nodes that the resource is not available;

selecting, by each of the nodes in the operational group from the list of optimized collective operations, a next optimized collective operation; and performing, by each of the nodes in the operational group, the next optimized collective operation.

2. The method of claim 1 wherein determining, by one or more of the nodes in the operational group, whether a resource needed by the one or more nodes to perform the collective operation is not available further comprises identifying an invalid class route.

3. The method of claim 1 wherein determining, by one or more of the nodes in the operational group, whether a resource needed by the one or more nodes to perform the collective operation is not available further comprises identifying an link failure on a link adjacent to the one or more nodes.

4. The method of claim 1 wherein the selected optimized collective operation further comprises an in-place operation; and performing the selected optimized collective operation includes copying the contents of the source buffer before performing the optimized collective operation; and selecting a next optimized collective operation further comprises restoring the copied contents to the source buffer.

5. The method of claim 1 wherein one or more of the nodes of the operational group supports transactional memory; and performing the collective operation includes beginning a transaction but not committing the transaction; and selecting a next optimized collective operation further comprises:

starting a new transaction without committing the previous transaction.

6. The method of claim 1 wherein the selected optimized collective operation further comprises an in-place operation; and performing the selected optimized collective operation includes blocking until receiving a notification that the operational group is valid.

7. The method of claim 1 wherein the parallel computer comprises:
- a plurality of compute nodes;
- a first data communications network coupling the compute nodes for data communications and optimized for point to point data communications; and
- a second data communications network that includes data communications links coupling the compute nodes so as to organize the compute nodes as a tree, each compute node having a separate arithmetic logic unit ('ALU') dedicated to parallel operations.

8. The method of claim 1 wherein the parallel computer comprises a plurality of compute nodes and where the compute nodes comprise:
- a host computer having a host computer architecture; and
- an accelerator having an accelerator architecture, the accelerator architecture optimized, with respect to the host computer architecture, for speed of execution of a particular class of computing functions, the host computer and the accelerator adapted to one another for data communications by a system level message passing module.

9. An apparatus for optimizing collective operations by an operational group on a parallel computer, the apparatus comprising a computer processor and a computer memory operatively coupled to the computer processor, the computer memory having disposed within it computer program instructions for:
- receiving an instruction to perform a collective operation type;
- selecting an optimized collective operation for the collective operation type;
- performing the selected optimized collective operation;
- determining whether a resource needed by the one or more nodes to perform the collective operation is not available;
- if a resource needed by the one or more nodes to perform the collective operation is not available:
  - notifying the other nodes that the resource is not available; and
  - selecting a next optimized collective operation; and
  - performing the next optimized collective operation.

10. The apparatus of claim 9 wherein computer program instructions for determining whether a resource needed by the one or more nodes to perform the collective operation is not available further comprises computer program instructions for identifying an invalid class route.

11. The apparatus of claim 9 wherein computer program instructions for determining whether a resource needed by the one or more nodes to perform the collective operation is not available further comprises computer program instructions for identifying an link failure on a link adjacent to the one or more nodes.

12. The apparatus of claim 9 wherein the selected optimized collective operation further comprises an in-place operation; and
- computer program instructions for performing the selected optimized collective operation includes computer program instructions for copying the contents of the source buffer before performing the optimized collective operation; and
- computer program instructions for selecting a next optimized collective operation further comprises computer program instructions for restoring the copied contents to the source buffer.

13. The apparatus of claim 9 wherein one or more of the nodes of the operational group supports transactional memory; and
- computer program instructions for performing the collective operation further comprises beginning a transaction but not committing the transaction; and
- computer program instructions for selecting a next optimized collective operation further comprises starting a new transaction without committing the previous transaction.

14. The apparatus of claim 9 wherein the parallel computer comprises:
- a plurality of compute nodes;
- a first data communications network coupling the compute nodes for data communications and optimized for point to point data communications; and
- a second data communications network that includes data communications links coupling the compute nodes so as to organize the compute nodes as a tree, each compute node having a separate arithmetic logic unit ('ALU') dedicated to parallel operations.

15. The apparatus of claim 9 wherein the parallel computer comprises a plurality of compute nodes and where the compute nodes comprise:
- a host computer having a host computer architecture; and
- an accelerator having an accelerator architecture, the accelerator architecture optimized, with respect to the host computer architecture, for speed of execution of a particular class of computing functions, the host computer and the accelerator adapted to one another for data communications by a system level message passing module.

16. A computer program product for optimizing collective operations by an operational group on a parallel computer, the computer program product disposed in a non-transitory, computer readable storage medium, the computer program product comprising computer program instructions for:
- receiving an instruction to perform a collective operation type;
- selecting an optimized collective operation for the collective operation type;
- performing the selected optimized collective operation;
- determining whether a resource needed by the one or more nodes to perform the collective operation is not available;
- if a resource needed by the one or more nodes to perform the collective operation is not available:
  - notifying the other nodes that the resource is not available; and
  - selecting a next optimized collective operation; and
  - performing the next optimized collective operation.

17. The computer program product of claim 16 wherein computer program instructions for determining whether a resource needed by the one or more nodes to perform the collective operation is not available further comprises computer program instructions for identifying an invalid class route.

18. The computer program product of claim 16 wherein computer program instructions for determining whether a resource needed by the one or more nodes to perform the collective operation is not available further comprises computer program instructions for identifying an link failure on a link adjacent to the one or more nodes.

19. The computer program product of claim 16 wherein the selected optimized collective operation further comprises an in-place operation; and computer program instructions for performing the selected optimized collective operation further comprises computer program instructions for copying the contents of the source buffer before performing the optimized collective operation; and computer program instructions for selecting a next optimized collective operation further comprises computer program instructions for restoring the copied contents to the source buffer.

20. The computer program product of claim 16 wherein one or more of the nodes of the operational group supports transactional memory; and computer program instructions for performing the collective operation further comprises beginning a transaction but not committing the transaction; and computer program instructions for selecting a next optimized collective operation further comprises starting a new transaction without committing the previous transaction.

* * * * *